(12) United States Patent
Gallatin et al.

(10) Patent No.: US 8,391,286 B2
(45) Date of Patent: *Mar. 5, 2013

(54) PACKET SWITCH METHODS

(75) Inventors: Tom Gallatin, San Jose, CA (US);
Denny K. Miu, San Francisco, CA (US);
King L. Won, San Jose, CA (US);
Patrick Pak Tak Leong, Palo Alto, CA (US); Ted C. Ho, San Jose, CA (US)

(73) Assignee: Gigamon LLC, Milpitas, CA (US)

( * ) Notice: Subject to any disclaimer, the term of this patent is extended or adjusted under 35 U.S.C. 154(b) by 159 days.

This patent is subject to a terminal disclaimer.

(21) Appl. No.: 12/870,731

(22) Filed: Aug. 27, 2010

(65) Prior Publication Data

US 2011/0216771 A1 Sep. 8, 2011

Related U.S. Application Data

(63) Continuation of application No. 12/255,561, filed on Oct. 21, 2008, now Pat. No. 7,792,047, which is a continuation of application No. 11/123,273, filed on May 5, 2005, now Pat. No. 7,440,467.

(60) Provisional application No. 60/568,310, filed on May 5, 2004.

(51) Int. Cl.
*H04L 12/28* (2006.01)

(52) U.S. Cl. ........ 370/389; 370/249; 370/401; 370/390; 370/352

(58) Field of Classification Search .................. None
See application file for complete search history.

(56) References Cited

U.S. PATENT DOCUMENTS

| | | |
|---|---|---|
| 5,754,532 A | 5/1998 | Dev et al. |
| 6,233,242 B1 | 5/2001 | Mayer et al. |
| 6,381,642 B1 | 4/2002 | O'Donnell et al. |
| 6,385,197 B1 | 5/2002 | Sugihara |
| 6,414,958 B1 | 7/2002 | Specht |
| 6,545,982 B1 | 4/2003 | Murthy et al. |
| 6,556,541 B1 | 4/2003 | Bare |
| 6,570,875 B1 | 5/2003 | Hegde |
| 6,741,592 B1 | 5/2004 | Edsall et al. |
| 6,775,290 B1 | 8/2004 | Merchant et al. |
| 6,839,349 B2 | 1/2005 | Ambe et al. |
| 6,868,086 B1 | 3/2005 | Putzolu et al. |
| 6,898,632 B2 | 5/2005 | Gordy et al. |
| 6,975,581 B1 | 12/2005 | Medina et al. |
| 7,170,892 B2 | 1/2007 | Major et al. |
| 7,245,587 B2 | 7/2007 | Phaal |
| 7,260,102 B2 | 8/2007 | Mehrvar et al. |
| 7,287,077 B2 | 10/2007 | Haugh et al. |

(Continued)

OTHER PUBLICATIONS

International Search Report and Written Opinion dated Aug. 31, 2005 for PCT Application No. PCT/US05/15868.

(Continued)

*Primary Examiner* — Duc C Ho

(74) *Attorney, Agent, or Firm* — Vista IP Law Group, LLP

(57) ABSTRACT

The present invention relates to a packet switch and a packet switching method. An example embodiment of the present invention comprises at least three network ports, at least one instrument port, a mux-switch, a packet switch fabric, and an address table. The embodiment updates the address table to include the source address of each ingress packet of each network port and associate the source address with that network port. The mux-switch routes the ingress packet traffic of each network port according to the identity of the network port so that at least a copy of the packet traffic of one of the network ports is routed to an instrument port. The packet switch fabric routes the packets from the instrument ports to the network ports according the destination address of the packet and the identity of the network port that is associated with the destination address as recorded in the address table.

20 Claims, 11 Drawing Sheets

U.S. PATENT DOCUMENTS

| | | | |
|---|---|---|---|
| 7,424,018 B2 * | 9/2008 | Gallatin et al. | 370/389 |
| 7,436,832 B2 | 10/2008 | Gallatin | |
| 7,440,467 B2 | 10/2008 | Gallatin et al. | |
| 7,474,666 B2 | 1/2009 | Kloth et al. | |
| 7,636,319 B2 * | 12/2009 | Shankar et al. | 370/249 |
| 2001/0055274 A1 | 12/2001 | Hegge et al. | |
| 2002/0054595 A1 | 5/2002 | Ambe et al. | |
| 2002/0075809 A1 | 6/2002 | Phaal | |
| 2003/0137979 A1 | 7/2003 | Hayon et al. | |
| 2003/0161303 A1 | 8/2003 | Mehrvar et al. | |
| 2003/0210686 A1 | 11/2003 | Terrell et al. | |
| 2004/0001513 A1 | 1/2004 | Major et al. | |
| 2004/0122920 A1 | 6/2004 | Josset et al. | |
| 2004/0153854 A1 | 8/2004 | Agrawal et al. | |
| 2005/0041665 A1 | 2/2005 | Weyman et al. | |
| 2005/0044227 A1 | 2/2005 | Haugh et al. | |
| 2005/0053073 A1 | 3/2005 | Kloth et al. | |
| 2005/0254490 A1 | 11/2005 | Gallatin et al. | |
| 2005/0265248 A1 | 12/2005 | Gallatin et al. | |
| 2005/0265364 A1 | 12/2005 | Gallatin et al. | |
| 2005/0271065 A1 | 12/2005 | Gallatin et al. | |
| 2008/0037531 A1 * | 2/2008 | Donoghue et al. | 370/386 |

OTHER PUBLICATIONS

Non-Final Office Action dated Apr. 10, 2008 for U.S. Appl. No. 11/123,273.

Non-Final Office Action dated Mar. 20, 2008 for U.S. Appl. No. 11/123,273.

Notice of Allowance dated Aug. 22, 2008 for U.S. Appl. No. 11/123,273.

Non-final Office Action dated Apr. 7, 2008, for U.S. Appl. No. 11/123,729.

Final Office Action dated Oct. 15, 2008, for U.S. Appl. No. 11/123,729.

Non-final Office Action dated Mar. 24, 2009, for U.S. Appl. No. 11/123,729.

Final Office Action dated Dec. 23, 2009, for U.S. Appl. No. 11/123,729.

Advisory Action dated Mar. 8, 2010, for U.S. Appl. No. 11/123,729.

Notice of Allowance & Fee(s) Due dated Sep. 14, 2010, for U.S. Appl. No. 11/123,729.

Non-final Office Action dated Mar. 19, 2008, for U.S. Appl. No. 11/123,377.

Notice of Allowance & Fee(s) Due dated Jul. 29, 2008, for U.S. Appl. No. 11/123,377.

Non-final Office Action dated Mar. 26, 2008, for U.S. Appl. No. 11/123,465.

Notice of Allowance & Fee(s) Due dated Jul. 29, 2008, for U.S. Appl. No. 11/123,465.

Non-final Office Action dated Mar. 2, 2010, for U.S. Appl. No. 12/255,561.

Notice of Allowance and Fee(s) Due dated Jun. 24, 2010, for U.S. Appl. No. 12/255,561.

Non-final Office Action dated Oct. 17, 2012, for U.S. Appl. No. 13/481,502.

Non-final Office Action dated Oct. 15, 2012, for U.S. Appl. No. 12/939,849.

* cited by examiner

| DA (6 Octets) | SA (6 Octets) | LENGTH/ETHER TYPE (2 Octets) | DATA | FCS (4 Octets) |

| DA (6 Octets) | SA (6 Octets) | Ether TYPE (2 Octets) 0x8100 | TAG (2 Octets) | LENGTH/ ETHER TYPE (2 Octets) | DATA | FCS (4 Octets) |

PACKET SWITCH METHODS

PRIORITY DATA

This application is a continuation of U.S. patent application Ser. No. 12/255,561, filed on Oct. 21, 2008, now issued as U.S. Pat. No. 7,792,047, which is a continuation of U.S. patent application Ser. No. 11/123,273, filed on May 5, 2005, now issued as U.S. Pat. No. 7,440,467, which claims the benefit of U.S. Provisional Patent Application No. 60/568,310, filed on May 5, 2004, the disclosures of all of which are expressly incorporated by reference in their entireties herein.

RELATED APPLICATIONS

This application is related to the following co-pending applications:

Application Ser. No. 11/123,729, filed on May 5, 2005, now issued as U.S. Pat. No. 7,835,358.

Application Ser. No. 11/123,377, filed on May 5, 2005, now issued as U.S. Pat. No. 7,424,018.

Application Ser. No. 11/123,465, filed on May 5, 2005, now issued as U.S. Pat. No. 7,436,832.

INCORPORATION BY REFERENCE

All publications and patent applications mentioned in this specification are herein incorporated by reference to the same extent as if each individual publication or patent application was specifically and individually indicated to be incorporated by reference.

FIELD OF THE INVENTION

The present invention generally relates to network switching technology and more specifically to a packet switch and having visibility into a network utilizing a packet switch.

BACKGROUND OF THE INVENTION

In a packet-switching network, the transmission, routing, forwarding, and the like of messages between the terminals in the packet-switching network are broken into one or more packets. Associated with each terminal in the packet-switching network is a unique terminal address. Each of the packets of a message comprises a source terminal address, a destination terminal address, and a payload, which contains at least a portion of the message. The source terminal address is the terminal address of the source terminal of the packet. The destination terminal address is the terminal address of the destination terminal of the packet. Further, each of the packets of a message may take different paths to the destination terminal, depending on the availability of communication channels, and may arrive at different times. The complete message is reassembled from the packets of the message at the destinations terminal. One skilled in the art commonly refers to the source terminal address and the destination terminal address as the source address and the destination address respectively.

The packet-switching network employs packet switches for forwarding the packet. A conventional N-port packet switch comprises N network ports, an N-input N-output packet switch fabric, and an address table; where N is a positive integer greater than or equal to three. Each network port comprises a network in port and a network out port. FIG. 1 is a simplified logical diagram of a conventional 3-port packet switch. Referring to FIG. 1, a first network port comprises a first network in port 101 and a first network out port 201. A second network port comprises a second network in port 102 and a second network out port 202, and a third network port comprises a third network in port 103 and a third network out port 203. The network in ports, including for example, the first network in port 101, the second network in port 102, and the third network in port 103, receive ingress packets.

The network out ports, including for example, the first network out port 201, the second network out port 202, and the third network out port 203, transmit egress packets. In operation, a network port is linked to and in communication with a set of terminals in the packet-switching network. The source addresses of the ingress packets received at the network in port of the network port are the terminal addresses of these terminals.

The conventional 3-port packet switch analyzes the ingress packets that each network port receives through its network in port. Further, the conventional 3-port packet switch records the source addresses of the ingress packets received at each network port and associates the source address of each ingress packet with the network port that received the ingress packet in address table 2. Therefore, address table 2 contains the terminal addresses of the active terminals that are linked to each network port, and each terminal address in address table 2 is associated with the network port that links to the terminal with the terminal address. The terminal addresses associated with each network port are removed from address table 2 according to a predetermined strategy commonly referred as the aging function. There are numerous methods available for associating a network port of the packet switch with the terminal addresses in address table 2. Examples of these methods include, but are not limited to, explicitly associating the network port with the terminal address by recording the terminal address and the identity of the network port that is linked to the terminal as an ordered pair in address table 2; and implicitly associating the network port with the terminal address by recording the terminal address in a designated area in address table 2 that is reserved for the network port. In a representative conventional packet switch, address table 2 resides in the memory of the packet switch.

Network in ports 101, 102, and 103, and network out ports 201, 202, and 203 are in communication with the corresponding inputs and outputs of packet switch fabric 1. Packet switch fabric 1 examines the destination address of each packet it receives from its inputs through network in ports 101, 102, and 103; and looks up the identity of the network port that associates with the destination address of the packet in address table 2. If the destination address of the packet is in address table 2, packet switch fabric 1 routes the packet to the network out port of the network port that is associated with the destination address through one of its outputs; otherwise, packet switch fabric 1 broadcasts the packet to all its outputs.

To explain the operation and features of a conventional packet switch, refer now to the following discussion in conjunction with the accompanying figures.

First, Ethernet packet switch formats will be discussed.

Ethernet Packet Formats

Packet switches have a series of IEEE standard enhancements. Originally a packet switch did not have a virtual local area network (VLAN) and its operation was governed by the IEEE 802.1 D standard. This standard specifies MAC address learning and how to forward packets based on the MAC address table.

Then the IEEE 802.1Q standard specifies VLAN and the protocols and functional requirements of a VLAN packet switch. The IEEE 802.1Q standard can be viewed as an enhancement of the 802.1 D standard. The most critical aspect of VLAN packet switching is the introduction of the VLAN tag and how to switch a packet based on not just the MAC address but also the packet's VLAN ID. Using a VLAN has become so common in packet switches that the support of 802.1 Q is expected.

1. Original Ethernet Packet (802.1 D Frame)

FIG. 2 illustrates a traditional Ethernet packet, where: DA: Destination MAC address (6 octets); SA: Source MAC address (6 octets); Length/Ether Type: (2 octets). When the value of these 2 octets is greater than 1536 decimal (0x0600 hex), then this field is interpreted as Ether Type. The Ether Types are obtained from the IEEE Ethertype Field Registrar (http://standards.ieee.org/regauth/ethertype/eth.txt). FCS is the four octets CRC checksum.

2. Ordinary VLAN Ethernet Packet (802.1 Q Frame)

FIG. 3 is a VLAN Ethernet packet. Here 4 octets are added to the original Ethernet frame. Two of the octets are for Ether type and two are for the tag. The value of the first Ether Type is 0x8100 to indicate this is an IEEE 802.1 Q VLAN tagged packet.

The two bytes (altogether 16 bits) of the VLAN tag are arranged as shown in FIG. 4. Since there are at most 12 bits for the VLAN ID, there can be at most $2_{12}$=4096 possible values. However, the value 0 means no VLAN ID and the value 4096 is reserved. Therefore there can be 4094 VLAN IDs.

3. Double-Tagging VLAN Ethernet Packet (IEEE 802.1 Q-in-Q)

FIG. 5 shows four more octets added to the 802.1 Q frame. The format of the newly added 4 octets is exactly like the format of the previous four octets. The so called double tagged VLAN ID is the VLAN ID in the first VLAN tag.

To further understand the operation and function of the packet switches refer now to the following discussion in conjunction with the accompanying figures.

There are two kinds of packet switches. They can be classified as unmanaged versus managed. The unmanaged packet switch does not need a CPU because everything on the switch is pre-configured. These unmanaged packet switches are generally low-end switches because they offer very limited flexibility and provide no information such as packet statistics to the user. These chips usually do not have the MAC and PHY blocks integrated and therefore the PCB board manufacturer has to put MAC and PHY chips with the packet switches in order for the whole system to work. Accordingly it is desirable to provide more flexibility in a switch for most applications. Therefore for most applications a managed packet switch is desired.

A managed packet switch includes a CPU interface where a processor, typically embedded on a PCB board together with the switch, can control the switch through a plurality of registers. The managed packet switch offers more functionality than the unmanaged switch, such as the ability to prioritize the sending out of packets so that the important packets leave the switch first after coming in. Furthermore, high-end switches support 802.1 Q-in-Q double VLAN tagging and are integrated with the MAC and PHY blocks.

As before mentioned packet switches are utilized extensively in networks; however, they present problems when trouble shooting a network. To describe the problems with packet switched networks during troubleshooting refer now to the following description in conjunction with the accompanying figures.

Conventional Network Monitoring Systems

FIG. 6 shows the traditional way of deploying instruments such as sniffers, intrusion detection systems (IDS), intrusion prevention systems (IPS) and forensic recorders on a packet switched network. In the conventional network monitoring system 600, the Internet 602 is coupled to a plurality of routers 603a and 603b, sniffers 604a to 604d, IDSs 606a and 606b, and a forensic recorder 608. In the present application, the term "instruments" is used for referring to the sniffers 604a-d, RMON (Remote Monitoring) probes (not shown), application monitors (not shown), IDSs 606a-b, and IPSs (not shown). There may be other kinds of instruments available in the market but the general characteristic is that, through these instruments, the user can perform certain monitoring, trouble-shooting or security activities over their network.

Note that multiple sniffers 604a-d and IDS 606a-b units are needed, and that the forensic recorder 608 can only monitor the conversation over one IP phone 610a, 610b or 610c via the span port of a switch 612. Overall the cost of ownership is high and the equipment takes up much space.

Network monitoring and trouble shooting is done by using a network analyzer or a monitor such as a sniffer 604a-d or a RMON probe on additional points in the network 600. A sniffer 604a-d can monitor the statistics of the packet traffic as well as capturing the packets. A RMON probe only monitors the statistics of the packet traffic.

The following lists the drawbacks of conventional network monitoring:

1. Both the sniffer and the RMON probe are expensive devices. The price of a typical Gigabit Ethernet sniffer is in the $15K range.

2. There are not that many monitoring ports available per unit, making the cost per port ratio extremely high. This situation is worse if the user has an extensive network that spreads over broad geographical locations, such as over several floors in a company building. In order to cover all the strategic sections of the network, the user has to install a sniffer or a RMON probe at every strategic section, making the cost of ownership extremely high.

3. More importantly, the user still cannot get an aggregated, simultaneous view of the traffic going through the different segments. This is particularly important after the introduction of Voice over IP (VoIP), where the voice packet traffic of a conversation may travel over multiple network segments simultaneously before reaching the user at the other end of the conversation.

4. Most network monitoring devices, protocol analyzers and RMON probes do not have hardware filtering capability. Instead, they use a CPU to filter packets through software. This imposes a filtering throughput restriction. This restriction is particularly problematic when filtering at line speed on high speed links.

5. Network visibility has decreased since the introduction of a packet switch. Before a packet switch, hubs were used. When hubs were used every port in the hub shares the same medium. Therefore every port can see the traffic at every other port. With this arrangement, network monitoring and trouble shooting is relatively easy because all the user needs is to plug in an instrument into one of the hub ports and visibility to all the traffic inside the hub is obtained.

However, because every port sees the traffic of every other port, a hub utilizes a significant amount of bandwidth. The problem of bandwidth usage leads to the use of a packet switch in a network. Through a MAC address learning and forwarding mechanism, a switch forwards a packet entering one port to out of another port without letting the other ports become involved. However, this becomes problematic for network monitoring and trouble-shooting because no matter which port in the switch the user plugs the sniffer into, the sniffer cannot see all the relevant traffic in the network.

To compensate for this, switch vendors provide a span port (or minor port) where the user can configure the switch to minor the traffic of a particular port or at most a few ports out of the span port. This is somewhat better but the network visibility is still not as good when compared with using a hub.

Another drawback of using a span port is that one user of the switch may alter the span port settings created by another user without letting the other user know. For example, in a company the network security people may use the span port to look at traffic at port X, and then in the middle of the night the IT people may come and change the span port settings to look at traffic at port Y. Though a lot of times this is not intentional, mistakes do occur and this may lead to severe negative impacts.

One way to work around the limitations of a span port is to buy an external tap where the network segment is tapped and a copy of the traffic is sent out to a sniffer or a RMON probe. The drawback of this is that there is another layer of infrastructure that the user needs to set up, increasing the cost of ownership as well as taking up valuable space in the IT area.

There is a variant of sniffer called the distributed sniffer system. In essence the user deploys multiple sniffers (called distributed sniffers) at key segments of their network. Each of these distributed sniffers has an IP address whereby a PC running special console software can access each of them via the users' existing network. This solves the problem of having the IT person running around the company with a sniffer box but it has several drawbacks. First, these distributed sniffers do not stream the monitored or captured packets to a centralized location. Rather, the statistics are collected locally and the packets captured are stored locally. When the user connects to a distributed sniffer unit remotely from a console, the statistics and the portion of packets that the user wants to see are then sent over a network (usually the user's network to be monitored) to the console.

Second, there is no real-time aggregation of packets collected over multiple network segments to a central area and this is not helpful for VoIP monitoring and trouble-shooting. It is also very expensive to overlay a separate network just to connect all these distributed sniffer units. Therefore most commonly the statistics and captured packets from a distributed sniffer unit are sent over the user's existing network to the PC running the console software. This utilizes a significant amount of bandwidth of the user's network.

Intrusion Detection Systems (IDS) and Intrusion Prevention Systems (IPS) are key elements in network security monitoring and network attack prevention. An IDS is a passive device which monitors the network traffic for suspicious activities and, if evidence of suspicious activities is found, informs the user. An IDS may also sends out packets back to the network for controlling a specific network element, such as performing a TCP reset on a router. An IPS is an active device in that it sits in the middle of the traffic and can block suspicious packets as well as sending its own packets to fool the intruder. The network traffic that is allowed to pass through an IPS goes back to the network. In any case the deployment of IDS or IPS presents the same set of problems as with the deployment of network monitoring devices (see items 1 through 4 above).

Accordingly, what is needed is a system and method for allowing for improved networking monitoring in a network that has packet switches. The system and method should be compatible with existing packet switches and easily adapted to a network environment and should be cost effective. The present invention addresses such a need.

SUMMARY OF THE INVENTION

The present invention relates to a packet switch and a packet switching method. An example embodiment of the present invention comprises at least three network ports, at least one instrument port, a mux-switch, a packet switch fabric, and an address table. The embodiment updates the address table to include the source address of each ingress packet of each network port and associate the source address with that network port. The mux-switch routes the ingress packet traffic of each network port according to the identity of the network port so that at least a copy of the packet traffic of one of the network ports is routed to an instrument port. The packet switch fabric routes the packets from the instrument ports to the network ports according to the destination address of the packet and the identity of the network port that is associated with the destination address as recorded in the address table.

According to an example embodiment of the present invention, a method for packet-switching comprises: receiving ingress packets through network ports; optionally updating an address table to include the association between the terminal address of the source terminal of each ingress packet of each network port and the network port that receives that ingress packet; directing the ingress packet traffic of each network port according to the identity of the network port so that at least a copy of the ingress packet traffic of one of the network ports is sent out of an instrument port; optionally packet-switching the packets from the instrument port to the network ports according to the terminal address of the destination terminal of each of the packet and the associations between terminal addresses and network ports recorded in the address table.

A system and method in accordance with the present invention presents a low cost implementation of the asymmetric packet switch. The advantages of using a commercial off-the-shelf packet switches is that the chip has been debugged by the vendor and that nowadays such switches are not expensive. Moreover, the high-end packet switch has significant functionality, including, but not limited to, filtering based on L2/L3/L4 information, quality of service (QoS), link aggregation, VLAN support, double VLAN tagging, spanning trees and per-VLAN spanning tree support and stacking of multiple chips. The key feature of the present invention is configuring a switch so that it has a set of network ports and a set of instrument ports, and that packets flowing from the network ports to the instrument ports go through a circuit switch, whereas at the same time packets flowing from an instrument port to a network port go through a packet switch.

In summary, a system and method in accordance with the present invention (1) saves development cost compared with developing FPGA and ASIC, (2) saves development time (including debugging time for ASIC and FPGA), (3) provides a reliable solution because the commercial layer 2/3 switches have been tested and have been used by quite a number of switch system vendors; and (4) leverages on the advanced functionalities of the current layer 2/3 switches.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

The present invention generally relates to network switching technology and more specifically to a packet switch and enhancing network visibility utilizing a packet switch.

The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

To describe the features of the present invention in more detail refer now to the following discussion in conjunction with the accompanying figures.

In a system and method in accordance with the present invention a packet switch is configured to allow for it to be used to aid in enhancing network visibility. In a preferred embodiment, the switch is a managed packet switch, however one of ordinary skill in the art recognizes that the switch could be implemented in a variety of other ways and that would be within the spirit and scope of the present invention. For example, the switch could be implemented as a Field Programmable Gate Array (FPGA), or an Application Specific Integrated Circuit (ASIC). The switch is used as a network visibility system to allow instruments such as sniffers, IDS, IPS, forensic recorders and the like to have more flexible and wider access to traffic flowing in a packet network. This is accomplished by controlling the movement of packets in accordance with one or more user-configurable configurations, by supporting filtering capabilities within the switch, by supporting flow distribution of traffic from at least one network port to at least one instrument port and by allowing the stacking of a plurality of switches together to form an extended network visibility system. To describe each of these features in more detail refer now to the following description in conjunction with the accompanying drawings.

Figure 7:
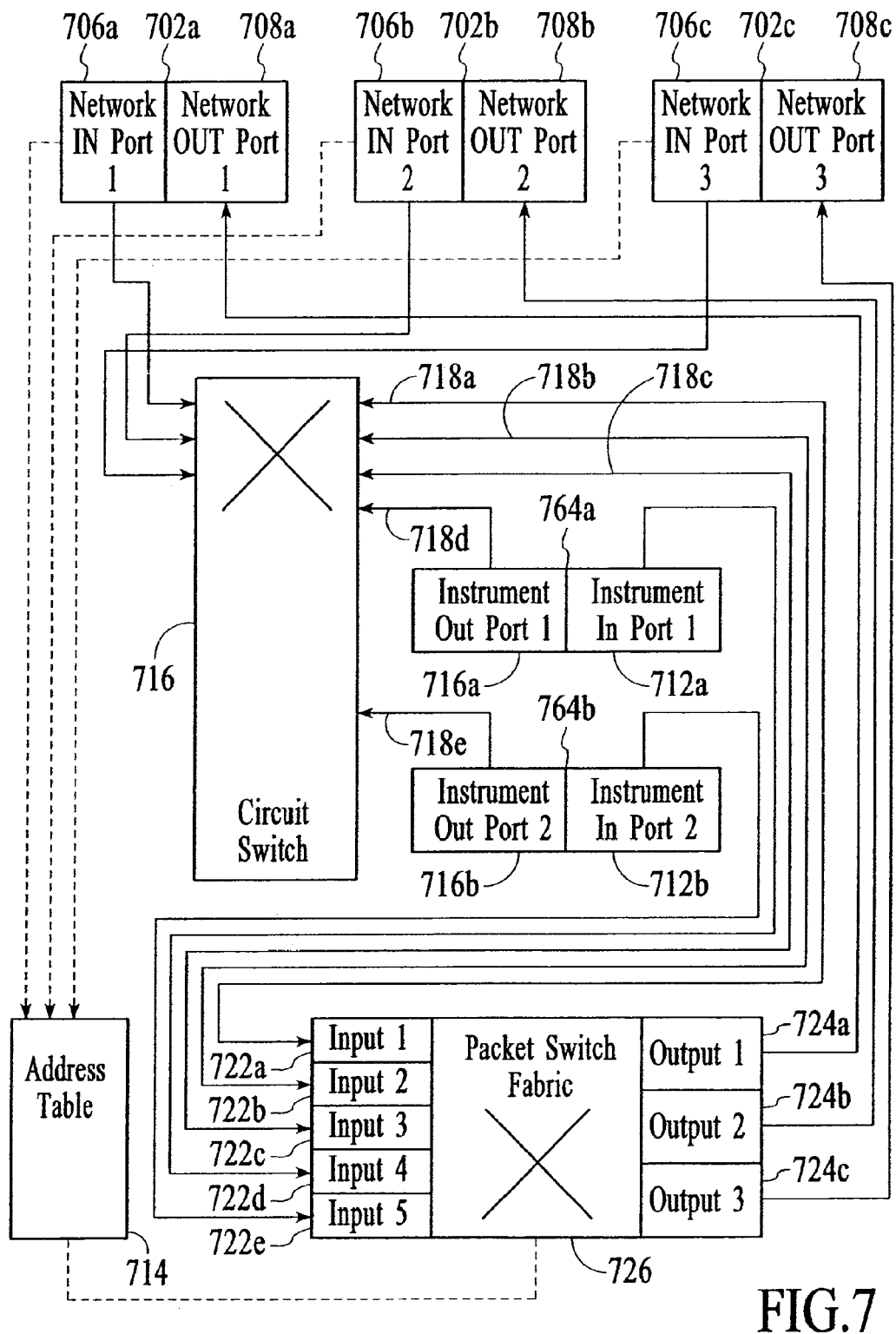
FIG. 7 is a functional block diagram of a packet switch according to the present invention.

FIG. 7 is a simplified functional diagram of a packet switch in accordance with the present invention. The embodiment comprises three network ports 702*a-c* and two instrument ports 704*a-b*. Each network port 702*a-c* comprises a network in port 706*a-c* and a network out port 708*a-c*. Each instrument port 704*a-b* comprises an instrument in port 712*a-b* and an instrument out port 710*a-b*. Referring to FIG. 7, a first network port 702*a* comprises a first network in port 706*a* and a first network out port 708*a*. A second network port 702*b* comprises a second network in port 706*b* and a second network out port 708*b*, and a third network port 702*c* comprises a third network in port 706*c* and a third network out port 708*c*. Further, a first instrument port 704*a* comprises a first instrument in port 712*a* and a first instrument out port 710*a*, and a second instrument port 704*b* comprises a second instrument in port 712*b* and a second instrument out port 710*b*. In operation, a network port is linked to and in communication with a set of terminals in the packet-switching network. The source addresses of the ingress packets originated from these terminals and received at the network in port of the network port are the terminal addresses of these terminals. The embodiment analyzes each ingress packet that the network in port of each network port receives. Further, the embodiment updates address Table 714 to include the source address of each ingress packet received at each network port and associate that network port with that source address, which is also the terminal address of a terminal that is linked to that network port. The terminal addresses associated with each network port are removed from address table 714 according to a predetermined strategy.

The ingress packets are directed from each network in port 706*a-c* to the corresponding circuit switch inputs of circuit switch 716. In FIG. 7, the circuit switch inputs of circuit switch 716 are shown on the left side of the circuit switch block and the circuit switch outputs of circuit switch 716 are shown on the right side of the circuit switch block. Circuit switch 716 is an example implementation of a mux-switch. A mux-switch comprises a plurality of mux-switch inputs and a plurality of mux-switch outputs. The functions of the mux-switch include but are not limited to, aggregating the packet traffic from multiple mux-switch inputs to a mux-switch output, or directing the packet traffic from a mux-switch input to a mux-switch output, or broadcasting the packet traffic from a mux-switch input to multiple mux-switch outputs, or a combination thereof. The circuit switch input of circuit switch 716 is a mux-switch input. The circuit switch output of circuit switch 716 is a mux-switch output. The mux-switch may be manually controlled or program controlled so that, for example, the packet traffic pattern in the mux switch is reconfigurable.

Circuit switch 716 functions as a circuit cross connect switch, in which circuit switch 716 directs the packet traffic from a circuit switch input to a circuit switch output. Optionally, circuit switch 716 aggregates the packet traffic from multiple circuit switch inputs to a circuit switch output, or circuit switch 716 directs the packet traffic from a circuit switch input to one circuit switch output, or circuit switch 716 multicasts the packet traffic from a circuit switch input to multiple circuit switch outputs, or circuit switch 716 aggregates the packet traffic from multiple circuit switch inputs and multicasts the aggregated packet traffic to multiple circuit switch outputs, or a combination thereof. The circuit switch 716 shown in FIG. 7 comprises five circuit switch outputs 718a-e. The packet traffic from at least one of the circuit switch outputs 718a-e is directed to a first instrument out port 710a. The packet traffic from the other circuit switch outputs 718a-e may be directed to other instrument out ports, for example, a second instrument out port 710b, or directed to the inputs 722a-e of packet switch fabric 720. Direct packet traffic from circuit switch 716 to packet switch fabric 720 is optional, and the second instrument out port 710b is optional. The packet traffic from instrument in ports, for example, first instrument in port 712a and second instrument in port 712b, are directed to the inputs of packet switch fabric 720. Second instrument in port 712b is optional.

Packet switch fabric 720 examines the destination address of each packet it receives from its inputs 722a-e; and looks up the identity of the network port that is associated with the destination address of the packet in address table 714. If the destination address of the packet is in address table 714, packet switch fabric 720 routes the packet to the network out port of the network port that is associated with the destination address in address table 714 through one of its outputs 724a-c; otherwise, packet switch fabric 720 broadcasts the packet to the network out ports of a predetermined selection of network ports. This predetermined selection may include no network port, or at least one network port, or all network ports.

According to an embodiment of the present invention, a method for packet-switching comprises: receiving ingress packets through network ports; updating address table 714 to include the association between the terminal address of the source terminal of each ingress packet of each network port and the network port that receives that ingress packet; directing the ingress packet traffic of each network port according to the identity of the network port so that at least a copy of the ingress packet traffic of one of the network ports is sent out of an instrument port using, for example, a mux-switch; packet-switching the packets from the instrument port to the network ports according to the terminal address of the destination terminal of each of the packets and the associations between terminal addresses and network ports recorded in the address table using, for example, packet switch fabric 720.

In an example application of an embodiment of the present invention, the network ports of the embodiment are coupled to a packet-switching network. The instrument ports of the packet-switching apparatus are coupled to network instruments. Examples of network instruments include but are not limited to: network analyzer, sniffer, network monitoring system, application monitoring system, intrusion detection system, intrusion prevention system, forensic storage system, and application security system.

Accordingly, it is desirable to provide a conventional packet switch that provides the functionality of the switch of FIG. 7 while providing visibility into various parts of a network. To fully understand the features of the present invention a description of packet switches is provided hereinafter.

A system and method in accordance with the present invention allows for the use of a conventional managed packet switch as part of the monitoring function. This is accomplished by configuring the packet switch to operate as a circuit switch under certain circumstances. The configuring of the managed packet switch is performed by utilizing the CPU interface of the switch to modify appropriate registers in the switch to allow for the desired operation. Facilities already present in the packet switch such as VLAN, filtering and redirection are utilized to provide the desired operation of the switch when utilized in providing network visibility. To describe the features of the present invention in more detail refer now to the following description in conjunction with the accompanying figures.

Figure 8:
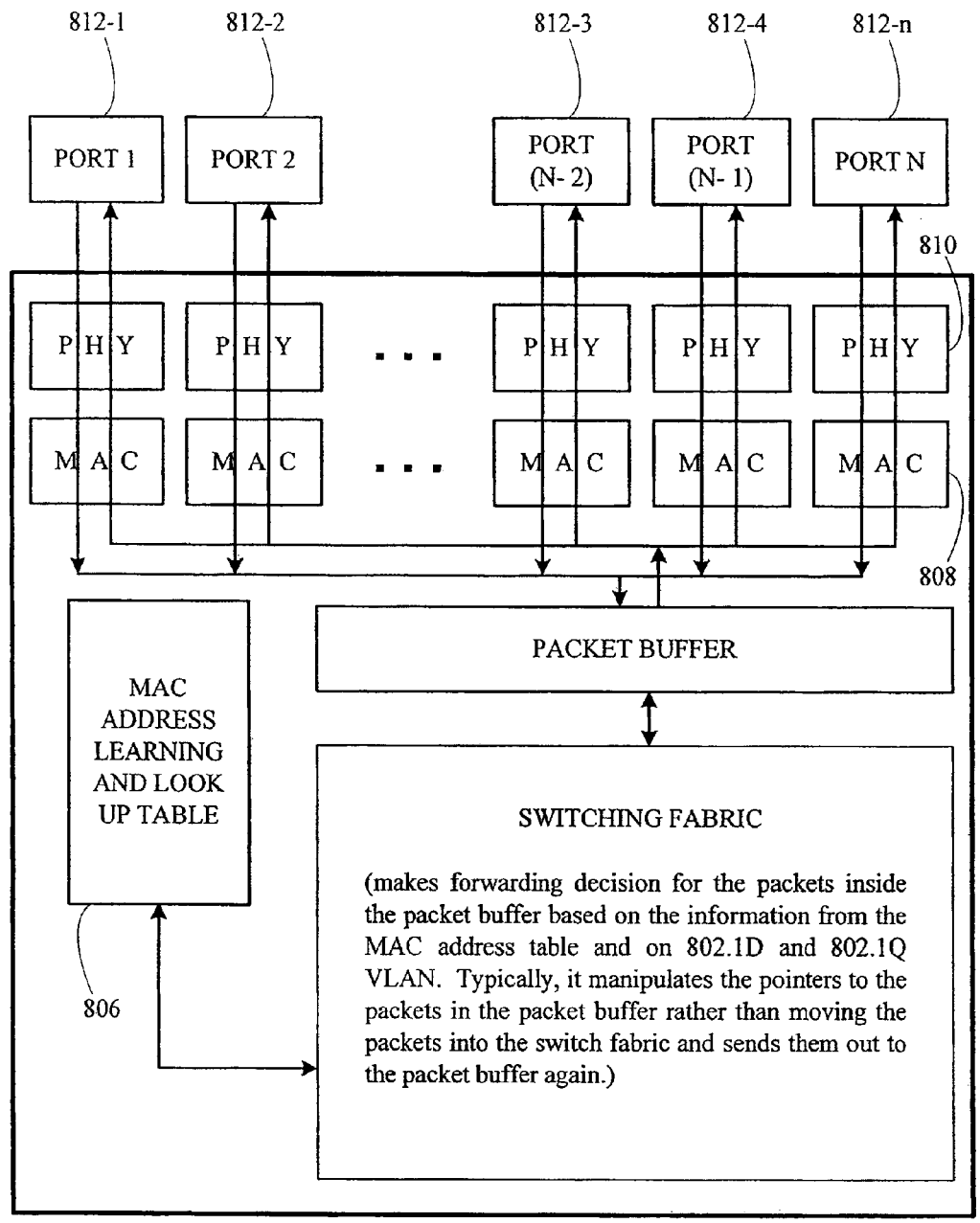
FIG. 8 is a block diagram of a physical layout of a conventional unmanaged packet switch.

FIG. 8 is a block diagram of a physical layout of a conventional unmanaged packet switch 800. The switch 800 comprises a switching fabric 802 which communicates with a packet buffer 804 and MAC address learning and look up table 806. The buffer 804 is in communication with ports 812-1 to 812-n via MAC and PHY layers 808 and 810 respectively.

The packet switch 800 does not need a CPU. Everything is pre-configured. These unmanaged packet switches are generally low-end switches because they offer very limited flexibility and provide no information such as packet statistics to the user. These chips usually do not have the MAC and PHY blocks integrated and therefore the PCB board manufacturer has to put MAC and PHY chips with the packet switches in order for the whole system to work. Accordingly it is desirable to provide more flexibility in a switch for most applications. Therefore for most applications a managed packet switch is desired.

Figure 9:
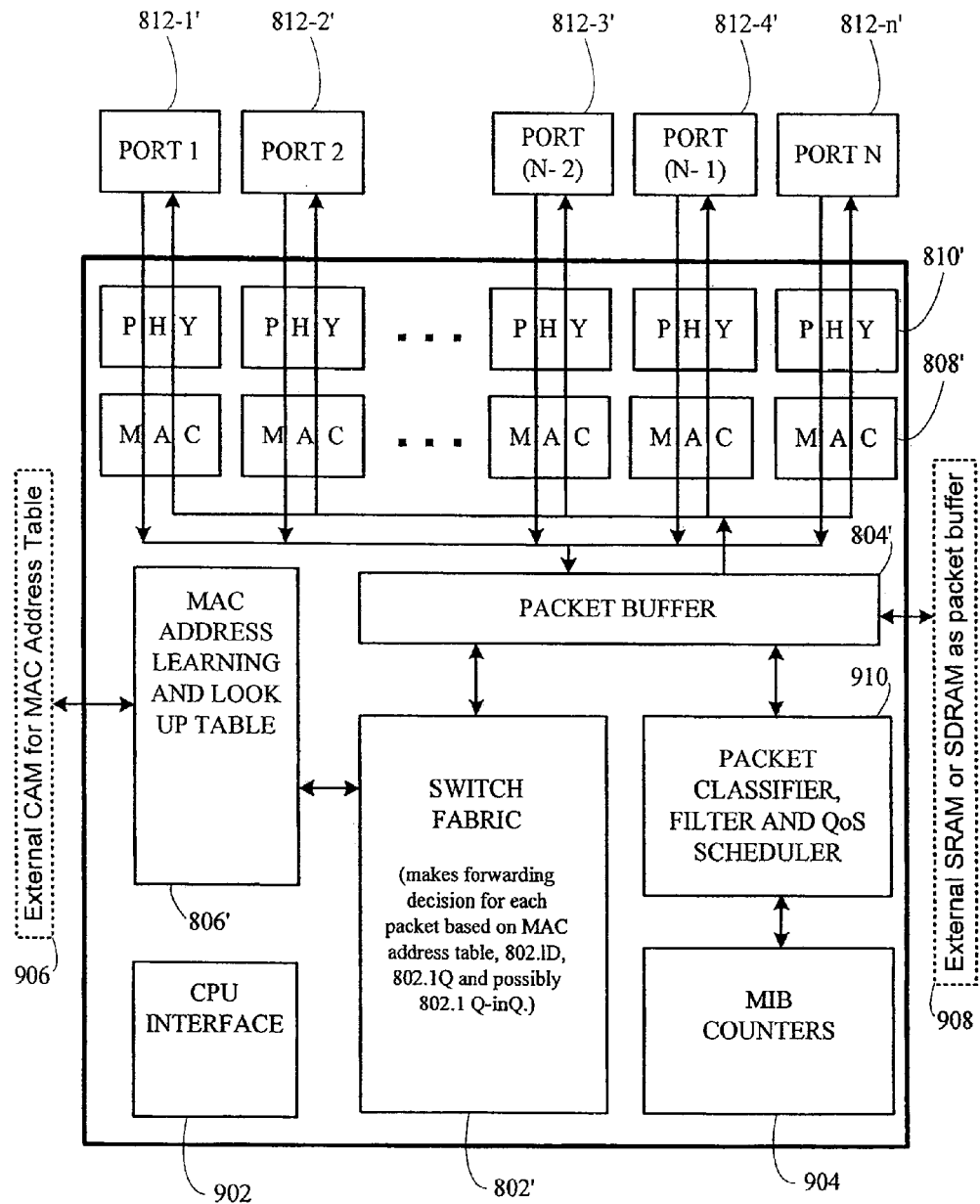
FIG. 9 is a block diagram of a physical layout of a conventional managed packet switch.

FIG. 9 is a block diagram of a physical layout of a conventional managed packet switch 900. The managed switch 900 includes many of the same elements as the unmanaged packet switch 800 of FIG. 8 and those elements have similar reference numbers. The managed switch 900 includes a CPU interface 902 where a processor (not shown), typically embedded on a PCB board together with the packet switch 900, can control the switches through a plurality of registers. The CPU interface 902 allows the packet switches to communicate to a (usually embedded) CPU, such as a Motorola MPC860 or MPC 8260. The registers of the packet switches are usually memory mapped to the CPU so that the CPU can control the switch by simply writing or reading the bits of these registers.

The managed packet switch 900 offers more functionality than the unmanaged switch 800, such as the ability to prioritize the sending out of packets so that the important packets leave the switch first after coming in. The packet switch 900 also offers a comprehensive set of statistics counters (MIB counters 904) where the CPU can read them through the counter registers. From these counters 904 the CPU can determine how many packets at each port are received or transmitted, whether there is any error etc. Furthermore, high-end switches support 802.1 Q-in-Q double VLAN tagging and are integrated with the MAC and PHY blocks.

The managed packet switch 900 supports IEEE 802.1D and IEEE 802.1Q VLAN based packet switching. The MAC address table in packet switches can be implemented either as an embedded memory block inside the switches; or as a piece of fast-addressable memory 906 outside of the switches; or as both. The fast-addressable memory 906 outside of the packet switches is usually a content-addressable memory (CAM).

As before mentioned the packet switch 900 has an internal packet buffer 804' so that packets can line up and be processed accordingly. This buffer 804' can be integrated into the switch

900 or it can be located outside the switches as a SRAM or SDRAM 908, or both. Note that the "Switch Fabric" block 802' represents the set of hardware logics that makes the forwarding decision of each packet.

The packet switch 900 includes a block 910. This block 910 has several functions which will be described herein below. The block 910 includes a packet classifier where an incoming packet is classified according to configurable rules set by the user via the CPU interface. Once packets are classified, they are treated differently according to the classes they belong to. For example, some classes of packets may be dropped, some may be assigned with a low egress priority or others may be assigned with a high egress priority.

The block 910 includes a filtering function. Filtering involves examining the content of a packet and then taking a drop or forward action against the packet. For example, in a packet switch, a filter module can even override the switching decision and directly send a packet over a certain egress port. Frequently the filter module relies on the identification information provided by the classifier module before a filtering decision can be made.

The block 910 includes a Quality of Service (QoS) engine. The main function of the QoS engine is to treat packets differently according to their respective priorities. High priority packets, for example, are processed and sent out of the switch first before the low priority packets.

The scheduler implements the decision of the QoS engine by lining up the different priority packets into different priority queues for each port. Then certain schemes are used to send out these packets. For example, the user may choose a scheme to send out all high priority packets first before sending out the lower priority packets (so called Strict-Priority); or the user may allocate a chunk of time to send out the high priority packets first, and if this chunk of time is exhausted but there are still some high priority packets waiting to be sent, it sends the next lower priority level packets over a chunk of time first before coming back to send out the high priority packets (so called weighted Round-Robin).

Accordingly, a system and method in accordance with the present invention utilizes a conventional managed packet switch to enhance network visibility for network monitoring, trouble-shooting and security management. To discuss the enhancement of visibility to the network in accordance with the present invention in more detail refer now to the following discussion in conjunction with the accompanying figures.

Figures 1, 2, 3:
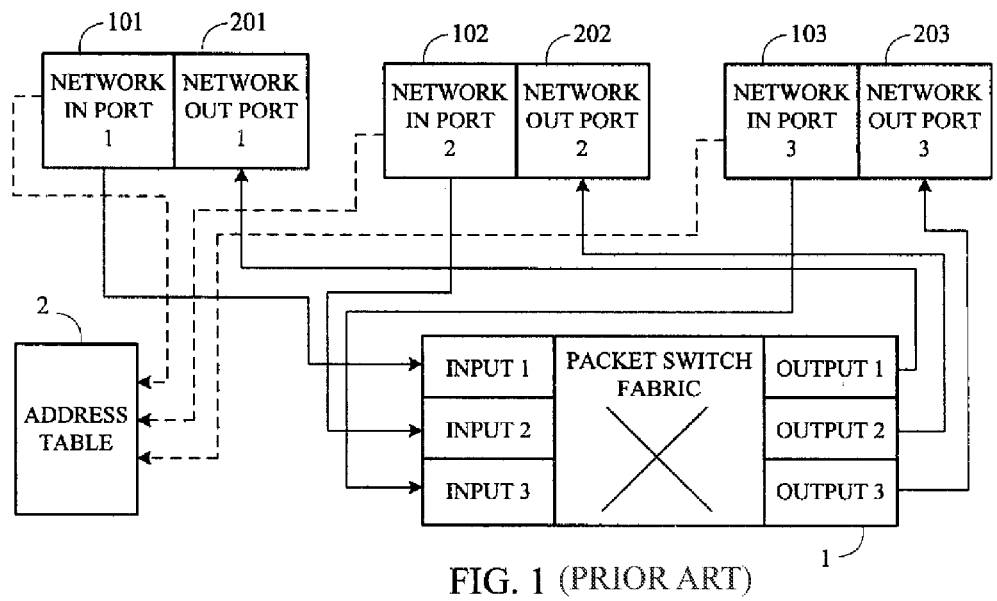
FIG. 1 is a simplified logical diagram of a conventional 3-port packet switch.
FIG. 2 illustrates a traditional Ethernet packet.
FIG. 3 is a VLAN Ethernet packet.
Figure 4:
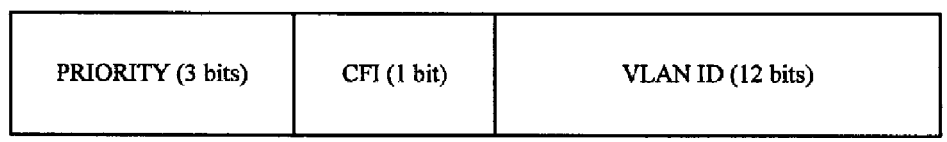
FIG. 4 shows a two byte arrangement of the VLAN tag.
Figure 5:
FIG. 5 shows four more octets added to the 802.1Q frame.
Figure 6:
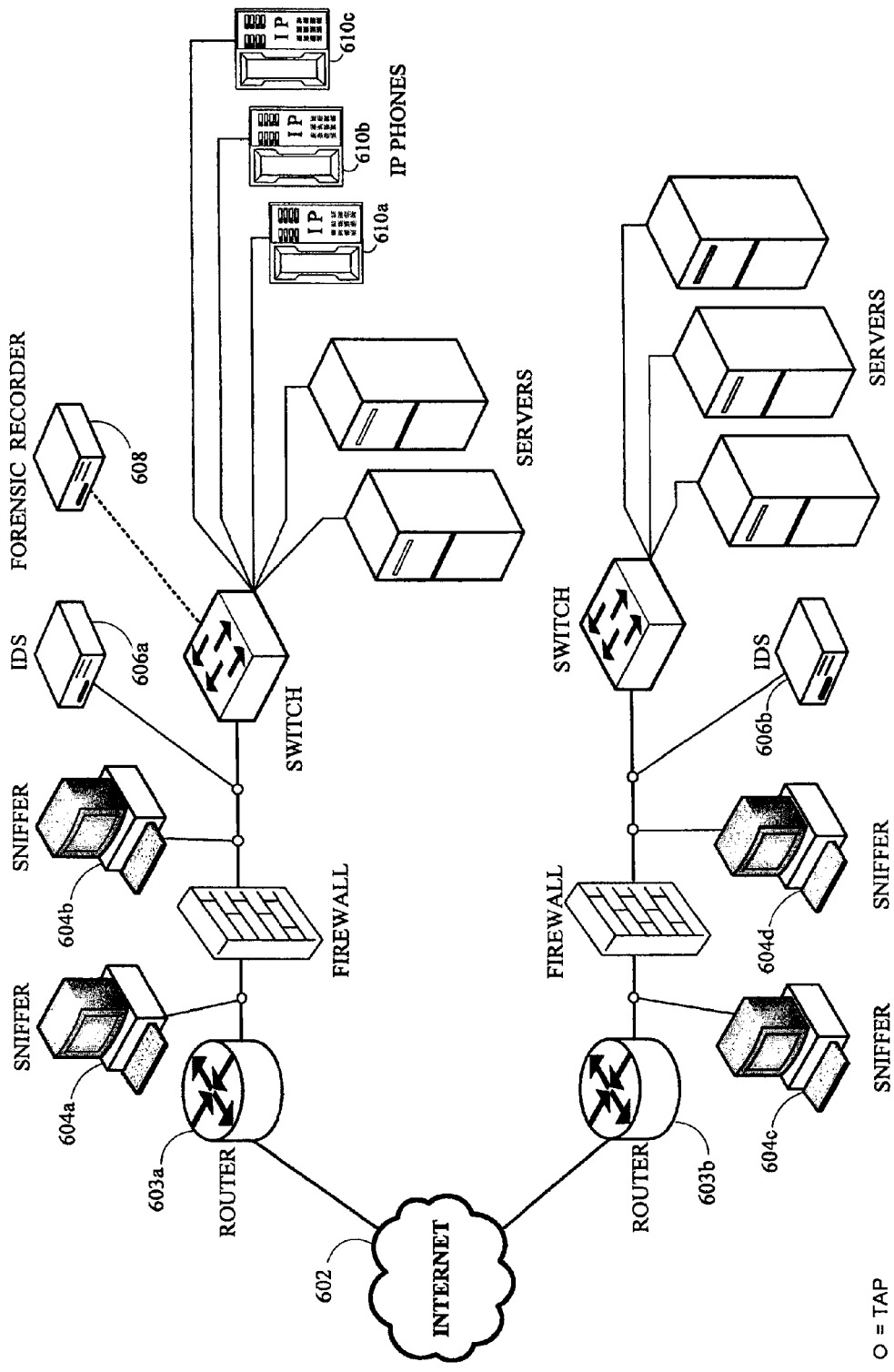
FIG. 6 shows the traditional way of deploying instruments, such as sniffers, intrusion detection systems, intrusion prevention systems and forensic recorders on a packet switched network.
Figure 10:
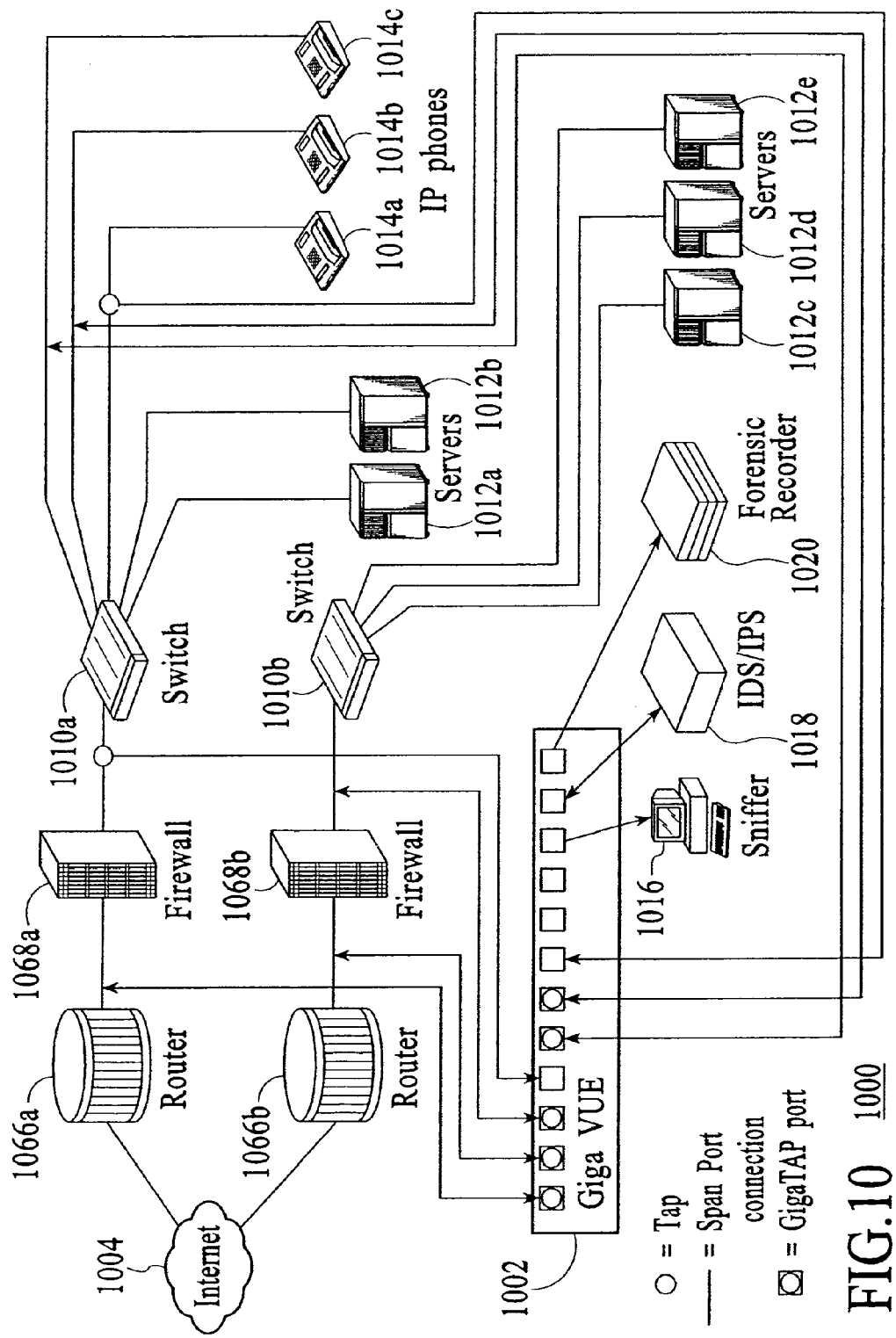
FIG. 10 shows the deployment of instruments with a network visibility system in accordance with the present invention.

FIG. 10 shows the deployment of instruments with a system 1000 in accordance with the present invention. The system includes a network visibility system 1002 which is coupled to the instruments. The Internet 1004 is coupled via routers 1006*a-b* and firewalls 1008*a-b* to two switches 1010*a* and 1010*b*. Switch 1010*a* is coupled to servers 1012*a-b* and IP phones 1014*a-c*. Switch 1010*b* is coupled to servers 1012*c-e*. A sniffer 1016, an IDS/IDP 1018 and a forensic recorder 1020 are also coupled to the network monitoring system 1002. As illustrated in FIG. 10, there is a reduction on the number of instruments in this deployment as compared to the deployment in FIG. 6 because the same instruments can now access information anywhere through the network visibility system. The user has complete flexibility to channel whatever traffic to whatever instrument or groups of instruments, using the any-to-any, any-to-many and many-to-one capability of the system in accordance with the present invention.

Also, the TAP-TX, TAP-SX and TAP-LX modules of the system in accordance with the present invention provides fault-tolerant tapping capability. If the network visibility system fails to function for whatever reason, the TAP-TX, TAP-LX and TAP-SX modules can maintain connectivity of the network attached to them without receiving any electrical power from the network visibility system. Therefore the user does not need to deploy an external tap at where he needs to tap traffic. However, the design of the system in accordance with the present invention does not prevent the usage of the external taps and span ports, as illustrated in FIG. 10.

All the conversations of the IP phones 1014*a-c* can be easily configured to be sent to an IDS or IPS 1018. It is also possible that traffic inside a particular IP phone 1014*a-c* connection can be sent to a sniffer 1016, and Intrusion Detection System/Intrusion Prevention System (IDS/IPS) 1018 and a forensic recorder 1020 simultaneously via the one-to-many function.

The system in accordance with the present invention, through Asymmetric Switching, provides the IDS/IPS with the ability to send back packets to the network via the back flow feature. The back flow feature can be turned off by the user through the software running at the CPU. These packets can, for example, trigger a TCP reset on a particular router when there is a denial-of-service attack on this router.

Every port inside the system in accordance with the present invention has a hardware filter that can filter incoming packets at full line bandwidth utilization. This allows the user to focus on specific traffic flows during network monitoring or trouble-shooting, yet without worrying that some packets may be dropped or incorrectly allowed to pass because of bandwidth limitation of the filters. To describe in more detail the operation of the packet switches to enable the above-identified functionality refer now to the following discussion in conjunction with the accompanying figures.

There are four distinct areas in a system and method in accordance with the present invention that allow for improved network visibility. The four areas are described in summary form herein below.

A first embodiment of the present invention relates to configuring a packet switch to support the following functionalities concerning the movements of packets within a network visibility system:

a. One-to one: Ingress packets at one port are taken out of another port. Typically ingress packets at a network port are provided to an instrument port.

b. One-to-Many: Packets are provided from one network port and are multicasted to multiple instrument ports.

c. Many-to-One: Aggregate packets from multiple network ports are sent to one instrument port.

d. Many-to-Many: Packets are aggregated from multiple network ports and the aggregated traffic stream is multicasted to multiple instrument ports.

e. Port-Pair: Essentially a tapping function. Suppose ports 1 and 2 form a port-pair. Ports 1 and 2 must be both network ports. All ingress traffic to port 1 is sent out of port 2, while at the same time this traffic stream may be sent to one or more instrument ports. In the other direction, all ingress traffic at port 2 is sent out of port 1, while at the same time the traffic stream may be sent to one or more instrument ports.

f. Back-flow: This allows packets sent from an instrument connected to an instrument port to go out of only one network port instead of flooding out over all ports. The network port from which these packets egress out eventually connects to an end station that has the destination MAC address of these packets.

A second embodiment of the present invention relates to configuring a packet switch to support various packet filtering capabilities:

a. Pre-filter: This is to filter (select or discard) ingress packets at a network port;

b. Post-filter: This is to filter (select or discard) egress packets at an instrument port.

In addition to 2a and 2b, event filters can be created that can pass or drop traffic based on certain events. For example, if the bandwidth utilization of the incoming traffic to a certain port exceeds a user-defined threshold value, then the packets are allowed to go to the instrument port. The bandwidth utilization can be calculated by periodically polling the packet and byte statistics counters of the switch. Also, the configuration of the pre-filter, post filter or event filter can be done automatically via a feed back path from an instrument connected to an instrument port to the switch.

The concept of post-filtering is not native to a commercial packet switch. Typically all filters are associated with the ingress traffic of a port. To work around this problem a plurality of ports of the switch are reserved to become loop back ports, where all packets that go through a post-filter to egress out of an instrument port are actually routed through a loop back port internally, and the post-filter is actually associated with the ingress direction of the loop back port. The ingress traffic from the loop back port is then sent out of the original instrument port. This concept can be generalized to what we call "virtual partitioning" of the switch, that is, provisioning some intermediary functional blocks (such as the loop back ports) of the switch in the middle of a data path to create new capabilities.

A third embodiment of the present invention relates to configuring the packet switch to support flow-based streaming and load balancing. In flow-based streaming, traffic from one or more network ports is connected to a plurality of instrument ports. The goal is to have each instrument port receive a different flow of the traffic. A flow can be characterized by a number of criteria, including, but not limited to, a connection between a pair of source and destination IP addresses, a connection between a pair of TCP port numbers within an IP connection, or some other connections specified by certain specific network protocol parameters.

In a load balancing configuration, traffic from one or more network ports is connected to a plurality of instrument ports. These instruments ports may have different line rates, such as some may be running at 1 Gbps and others may be running at 100 Mbps or 10 Mbps. The goal is to have the ingress traffic from the network ports spreading out over the instrument ports according to the maximum bandwidth that each instrument port can handle. For example, an instrument port that is running at 1 Gbps has more egress traffic than an instrument port that is running at 10 Mbps. Also, the distribution of ingress traffic from the network ports to the instrument ports can be optionally done by the assignment of bandwidth weight factors to the instrument ports. For example, even if all the instrument ports have the same physical bandwidth capability, the user can assign different bandwidth weight factors to these instrument ports so that different instrument ports may have different egress traffic rates.

A fourth embodiment of the present invention concerns the stacking of multiple network visibility systems to form an extended network visibility system. Stacking involves joining a plurality of the network visibility systems together to form an extended network visibility system. These embodiments are described in more detail below.

First Embodiment

Movement of Packets within the Network Visibility System

One-to-One: Ingress packets at one port are provided to another port. Typically, this involves taking ingress packets at a network port and egress out of an instrument port. However, one-to-one can also be used for port-pairing, that is, traffic entering a network port is sent out of another network port, and vice versa, making these two network ports form a port-pair.

There are three different methods to implement one-to-one.

The first method involves using a virtual local area network (VLAN) identifier to direct the packets. A VLAN is created with membership having only the two ports involved in this one-to-one connection. For example, suppose the VLAN number for this VLAN is X. The ingress port is set up such that the default VLAN ID is X. With this setting, all packets entering the ingress port will be tagged with a VLAN tag having VLAN number X. All such ingress packets will be flooded out of the second port, hence forming a one-to-one connection. Also, the egress port is configured such that the VLAN tag X is removed as the packets come of out the port.

One criterion for the VLAN method to work is to have the switch capable of doing double VLAN tagging on a per port basis. With double VLAN tagging on, all ingress packets will have a VLAN tag of VLAN number X, independent of whether such packets already have VLAN tags or not before they come into the network monitor port. The VLAN number assigned to any particular one-to-one connection is automatically assigned by the network visibility system software and the user does not need to know about this. All the user sees is that packets entering one port come out of another port. The VLAN method supports bi-directional flow of packets between the two any-to-any ports if both ports are set up with default VLAN IDs equal the VLAN number.

A second method involves using port mirroring. For a one-to-one connection involving ports A and B, one can set up a minor port B for port A such that all packets entering port A will get sent out of port B. Mirroring can be done independent of whether the packets already come with VLAN tags or not before they enter network monitor. Also, mirroring allows ingress error packets to come out as-is at the egress port.

The third method involves using a packet switch port filtering feature to direct a packet that enters a given port to out of another port. The advantage of using a filter is that it can re-direct packets to any port without being restrained by their VLAN memberships b. One-to-Many: Packets from one network port are multicasted to multiple instrument ports.

Typically, one-to-many is used to multicast traffic entering a given network port to multiple instrument ports.

One-to-Many can be implemented using VLAN. A VLAN is created such that the ingress network port and the multiple instrument ports are the only members of this VLAN. For example, suppose a VLAN is created with VLAN number X containing members of the above mentioned ports. The ingress network port is set up such that the default VLAN ID is X. The instrument ports in this one-to-many configuration are set up such that the VLAN tag of each packet is removed when a packet exits out of each instrument port. The double VLAN tagging feature is needed for this configuration.

When a packet enters the network port, a VLAN tag of VLAN ID X is added to the packet inside the switches, independent of whether this packet already comes with VLAN tags or not. This packet will be flooded to all the instrument ports of this VLAN because they all belong to VLAN X. The VLAN tag with VLAN ID X is removed when the packet (or a copy of it) exits each instrument port.

c. Many-to-One: Takes packets from multiple ports to one port.

Typically, Many-to-One is used to aggregate multiple packet streams from multiple network ports to one instrument port. For example, one may want to aggregate Voice over IP traffic from multiple network segments to one network analyzer.

The Many-to-One configuration can be achieved by VLAN, by port mirroring or by filter redirection.

VLAN Method

Figure 11:
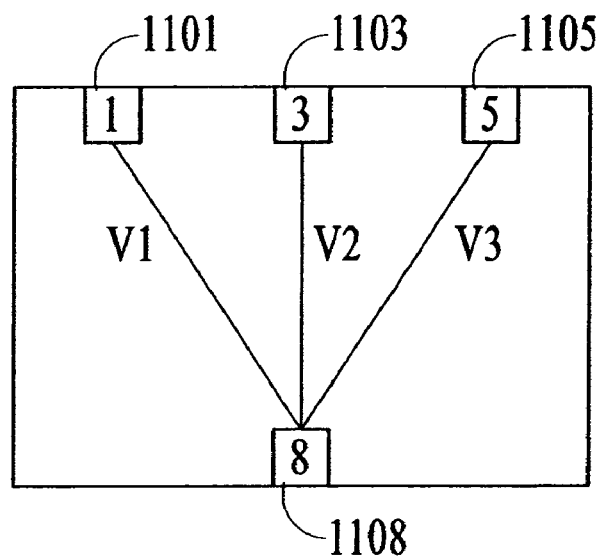
FIG. 11 is a simple block diagram of a plurality of network ports providing packets to one instrument port.

With the VLAN method, a separate VLAN is created between each network port and the instrument port. FIG. 11 is a simple block diagram of a plurality of network ports 1101, 1103 and 1105 providing packets to one instrument port 1108. In this example the network ports are ports 1101, 1103 and 1105 and the instrument port is port 1108. VLAN V1 has a membership having only network port 1101 and instrument port 1108; VLAN V2 has a membership having only network port 1103 and instrument port 1108, and VLAN V3 has a membership having only network port 1105 and instrument port 1108. The default VLAN ID for network ports 1101, 1103 and 1105 are V1, V2 and V3 respectively. Instrument port 1108 is set up such that a VLAN tag is removed for each packet exiting port 1108. In this embodiment double VLAN tagging is needed.

When a packet enters network port 1101, it will be tagged with a VLAN tag of VLAN number V1 inside the switch. This packet will be flooded out of instrument port 1108 because port 1108 is the only other port in VLAN V1. The same reasoning applies to packets entering network ports 1103 and 1105.

The many-to-one configuration can also be achieved by using port mirroring. For example, in FIG. 11, port 1108 can be set up as the minor port for ports 1101, 1103 and 1105. For each packet that enters ports 1101, 1103 or 1105, a copy of this packet will be sent out of port 1108. No VLAN and no filter redirection are needed.

Filter Redirection

If using the packet switch filter redirects implementation, a filter is set up at each network port 1101, 1103 and 1105 such that any packet that enters network ports 1101, 1103 and 1105 is redirected to instrument port 1108. This redirection can be performed on all packets entering the above network ports independent of whether they already have VLAN tags or not before they enter these network ports.

d. Many-to-Many: Aggregate packets from multiple network ports and multicast the aggregated traffic stream to multiple instrument ports.

This is a configuration resulting from a combination of any-to-any, one-to-many and many-to-one and can be configured using VLAN and filter redirection.

e. Port-Pair

A port-pair can be formed using port mirroring as described in the any-to-any case. Typically a port-pair is created between two network ports and very often there is another connection from each network port to at least one instrument port. In this case port-mirroring is used to form the port-pair while VLAN or filter redirection is used to form the connections to the instrument ports.

f. Back Flow

Backflow allows packets sent from an instrument connected to an instrument port to go out of only one network port instead of flooding out over all ports. The network port from which these packets egress out eventually connects to an end station that has the destination MAC address of these packets from the instrument.

The challenge associated with implementing backflow is to maintain circuit switching with the network ports and maintaining packet switching with the instrument ports. Traditionally, a packet switch supports packet switching only, and traditionally circuit switching does not mix well with packet switching within the same switch.

Figure 12:
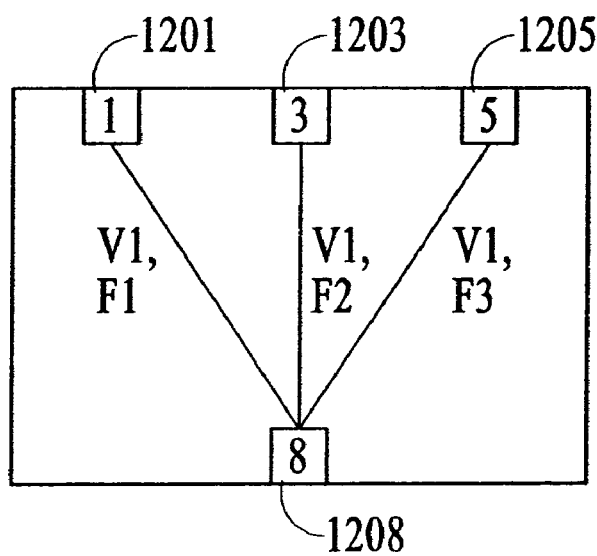
FIG. 12 is an example of an implementation of back-flow support.

FIG. 12 is an example of an implementation of back-flow support. In FIG. 12, ports 1201, 1203 and 1205 are assigned as network ports and port 1208 is assigned as an instrument port. It is desired that packets that enter port 1201 to go directly to port 1208 without flooding to ports 1203 and 1205. It is also desired that packets that enter port 1203 to go directly to port 1208 without flooding to ports 1201 and 1205. Similarly, it is desired that packets that enter port 1205 to go directly to port 1208 without flooding to ports 1201 and 1203. In other words, it would be desirable to have circuit switching for ports 1201, 1203 and 1205.

An instrument connected to port 1208 may want to send out packets to an end station that is connected to, for example, port 1201. This situation may happen if the instrument is an Intrusion Detection System (IDS) and it wants to send out a TCP reset packet to reset the TCP stack of an end station connected to port 1203. Certainly it is not desirable for this packet that is addressed to the end station connected to port 1203 to get flooded over to ports 1201 and 1205. In other words, packet switching is needed for packets that enter port 1208.

The back flow feature may be implemented based on the following as illustrated in FIG. 12:

1. A packet switch filter redirection is provided for packets entering each network port to instrument port 1208. In this way, any packet that enters either port 1201, 1203 or 1205 will be directed to port 1208 without being flooded over to any other ports.

2. At the same time, a VLAN with VLAN number X is created that has membership for ports 1201, 1203, 1205 and 1208 only.

3. The default VLAN IDs for ports 1201, 1203, 1205 and 1208 are all set to X.

4. Double VLAN tagging is turned on for ports 1201, 1203, 1205 and 1208.

5. Learning is enabled for ports 1201, 1203 and 1205.

6. Since learning is enabled at ports 1201, 1203 and 1205, the learning engine inside the switch will create MAC address entries (in the form of <MAC address, port number, VLAN number> for any packets that enter ports 1201, 1203 or 1205).

8. For packets that enter port 1208, packet switching will occur based on the entries in the MAC address table and hence such packets will be directed to only one of the ports 1201, 1203 or 1205, depending on their destination MAC addresses, but will never be flooded over to ports 1201, 1203 and 1205.

Second Embodiment

Filtering

There are two kinds of filters supported in the network monitor: pre-filter and post-filter.

The packet switch allows packet filtering on a per port basis at the ingress direction.

A filter can selectively pass or drop an ingress packet based on the filtering criteria. A filtering criterion is set up by the user and can be based on the L2/L3/L4 packet content together with a bit mask.

Figure 13:
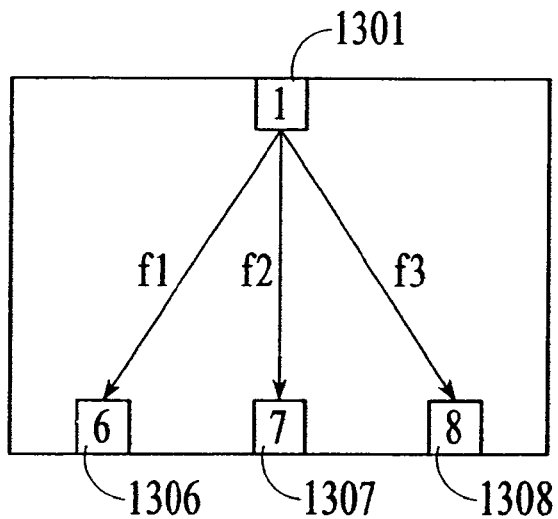
FIG. 13 shows a traffic stream composed of HTTP, TCP and UDP traffic entering a network port.

Pre-filter is a direct application of the ingress filtering capability of the packet switch. Hence pre-filter applies the filter to all ingress packets at a given port, independent of their egress ports. There are situations in the network visibility system where packets entering an ingress port are multicasted out to multiple instrument ports. Each instrument port may want to see a different filtered subset of this packet stream. For example, in FIG. 13, a traffic stream composed of HTTP, TCP and UDP traffic enters network port 1301. The user may set up the network monitor to have this traffic multicasted out to instrument ports 1306, 1307 and 1308. Ports 1306 may be connected to an instrument that is interested in seeing port 1301's HTTP traffic only. Port 1307 may be connected to an instrument that wants to see port 1301's TCP traffic only. Similarly, port 1308 may want to see port 1301's UDP traffic only. Hence it would be desirable to have egress filters instead of ingress filters. Such egress filters can be placed on ports 1306, 1307 and 1308. This is accomplished by the post-filters f1, f2 and f3 in the network monitor.

Figure 14:
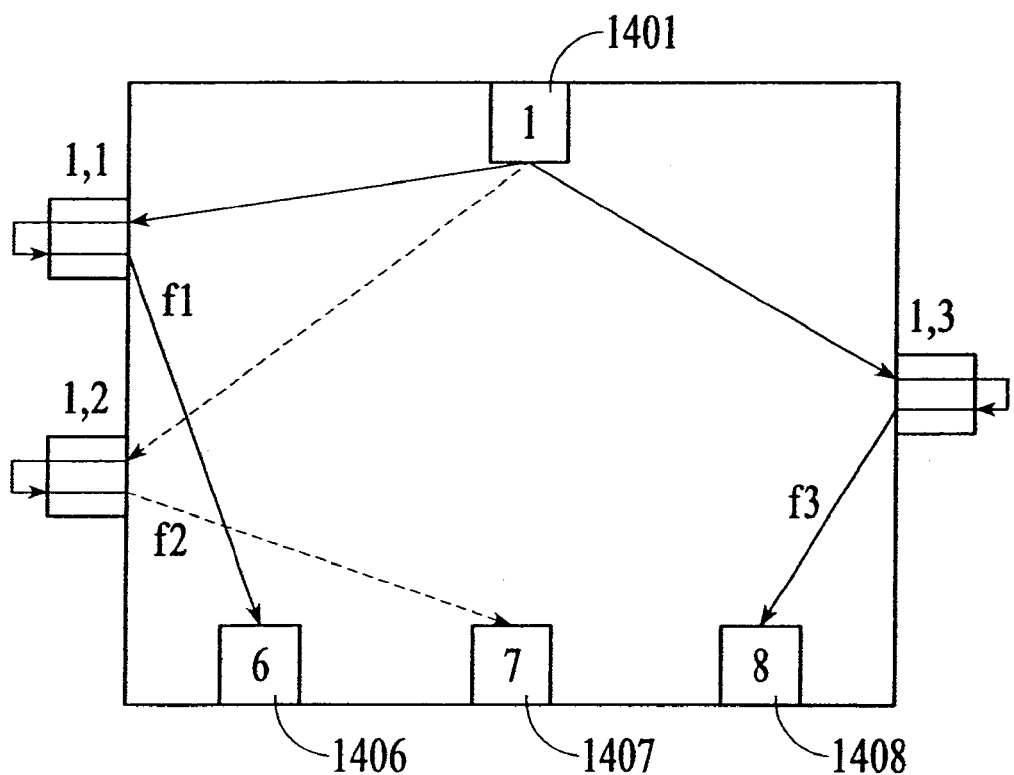
FIG. 14 shows the implementation of the post-filters for FIG. 13.

Since the packet switch only supports ingress filters, post-filters (egress filters) have to be constructed by sacrificing some ports within the switch as loop back ports. FIG. 14 shows the implementation of the post-filters for FIG. 13.

In order to support post-filter, a plurality of ports of the switch are reserved as loop back ports. These loop back ports are not visible to the user and they are also not directly accessible to the user. FIG. 14 shows three of such loop back ports, L1, L2 and L3, being used to support the post-filters mentioned in the above example.

Double VLAN tagging is turned on for ports 1401, L1, L2, L3, 1406, 1407, and 1408.

Ports 1401 and L1 are connected via a VLAN V1. Ports L1 and port 1406 are connected via a different VLAN V1'. Port L1 is set up such that all packets leaving L1 will have their VLAN tag removed, and that a HTTP filter f1 is associated with port L1. HTTP filter f1 will allow only the HTTP packets entering L1 to pass. Traffic entering port 1401 will be multicasted to port L1 and subsequently loop backed to port L1. This stream of traffic will be subjected to HTTP filter f1 before reaching port 1406 and egress out of port 1406. The loop back at port L1 can be done at the MAC level or at the PHY level.

Similarly, ports 1401 and L2 are connected via yet another different VLAN V2. Ports L2 and port 1407 are connected via another different VLAN V2. A TCP filter f2 is setup at port L2. Packets that enter port 1401 are multicasted to port L2, looped back and subjected to the TCP filter f2 before reaching port 1407 and egress out of port 1407.

Ports 1401 and L3 are connected via another VLAN V3. Ports L3 and port 1408 are connected via another different VLAN V3'. A UDP filter f3 is setup at port L3. Packets that enter port 1401 are multicasted to port L3, looped back and subjected to the UDP filter f3 before reaching port 1408 and egress out of port 1408.

In this way the same packet stream that enters port 1401 is being filtered differently as it egresses out of ports 1406, 1407, and 1408. Effectively filters f1, f2 and f3 are egress post-filters.

Figure 15:
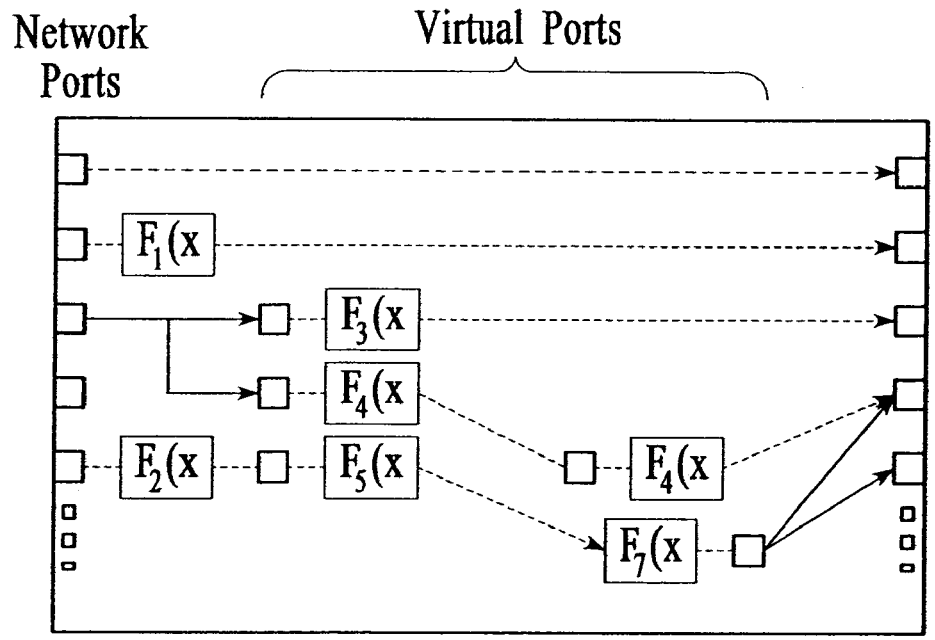
FIG. 15 shows functions F3 through F7 in a virtual partitioning of a switch.

The concept of using some intermediary ports of the switch to perform some functions that are beyond the normal capabilities of a switch is referred to in the present application as "virtual partitioning". In FIG. 15 functions $F_3$ through $F_7$ are called virtual ports. In the case of post-filtering, function $F_3$ is a loop back port.

There is another type of filtering called event-filtering. This is allows the passing or dropping of packets based on certain events observed by the switch. For example, allow packets can be allowed to pass from a network port to an instrument port only if the ingress bandwidth utilization exceeds a certain user-defined threshold. For example, this is used to check for a Denial-of-Service attack. Such events can be derived from the switch registers. In the case of the bandwidth utilization, the current bandwidth utilization can be calculated by having a periodic poll over the packet and byte statistics counters of a port.

Third Embodiment

Flow-Based Streaming and Load Balancing

In flow-based stream, traffic from one or more network ports is connected to one or more instrument ports. The goal is to have each instrument port receive a different flow of the traffic. A flow can be characterized by a number of criteria, including, but not limited to, a connection between a pair of source and destination IP addresses, a connection between a pair of TCP port numbers within an IP connection, or some other connections specified by certain specific network protocol parameters.

One method of implementing flow-based stream using a conventional packet switch is to use the link aggregation (trunking) capability of the switch. (Reference: IEEE 8021 ad). In a link aggregation configuration, multiple ports are bundled together into a logical port. Traffic that egresses out of this logical port is distributed to its member ports according to a deterministic hashing algorithm which can be based on the L2, L3 and L4 information of the packets. In the packet switches, for example, the hashing algorithm can be based the source and destination MAC addresses and the source and destination IP addresses of each packet. Alternatively, flow-based streaming can be implemented by filter re-direction of packets based on packet contents.

Figure 16:
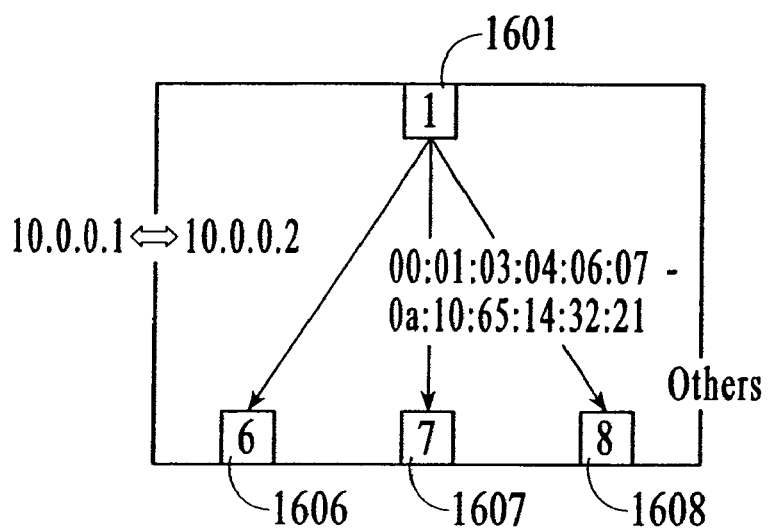
FIG. 16 shows an example of an application where traffic entering one port is distributed over a plurality of ports based on different IP address-based flows, or MAC address ranges, or other protocol criteria.

FIG. 16 shows an example of each of an application where traffic entering port 1 is distributed over ports 1606, 1607, and 1608 based on different IP address-based flows, MAC address ranges and other protocol parameters. The user wants all traffic that belongs to the flow between IP addresses 10.0.0.1 and 10.0.0.2 to go out of port 1606. All traffic that belongs to the flow between MAC addresses 00:01:03:04:06:07 and 0a:10:65:14:32:21 goes out of port 1607. The rest of the traffic from port 1601 goes out of port 1608. Ports 1606, 1607 and 1608 form a trunk group and act as one logical port. The trunk group is set up such that the hashing algorithm sends all packets having source or destination IP addresses 10.0.0.1 and 10.0.0.2 to go out of port 1606; and that all packets having source or destination MAC addresses of addresses 00:01:03:04:06:07 and 0a:10:65:14:32:21 to go out of port 1607; the rest of the packets to go out of port 1608.

In load balancing, traffic from one or more network ports are sent to a plurality of instrument ports. The instrument ports may be connected to a plurality of instruments having ports that are running at different line rates. Load balancing allows the sending out of more packets per unit time on the instrument ports running at a higher line rate than the ones running at a lower line rate. Also, the distribution of ingress traffic from the network ports to the instrument ports can be optionally done by the assignment of bandwidth weight factors to the instrument ports. For example, even if all the instrument ports have the same physical bandwidth capability, the user can assign different bandwidth weight factors to these instrument ports so that different instrument ports may have different egress traffic rates.

Load balancing can be achieved by turning on the QoS engine of a packet switch to monitoring the packet queues of each egress port. Egress ports having a higher line rate empties out their packet queues faster and therefore the QoS engine can feed in more packets per unit time to these queues.

Fourth Embodiment

Stacking

Figure 17:
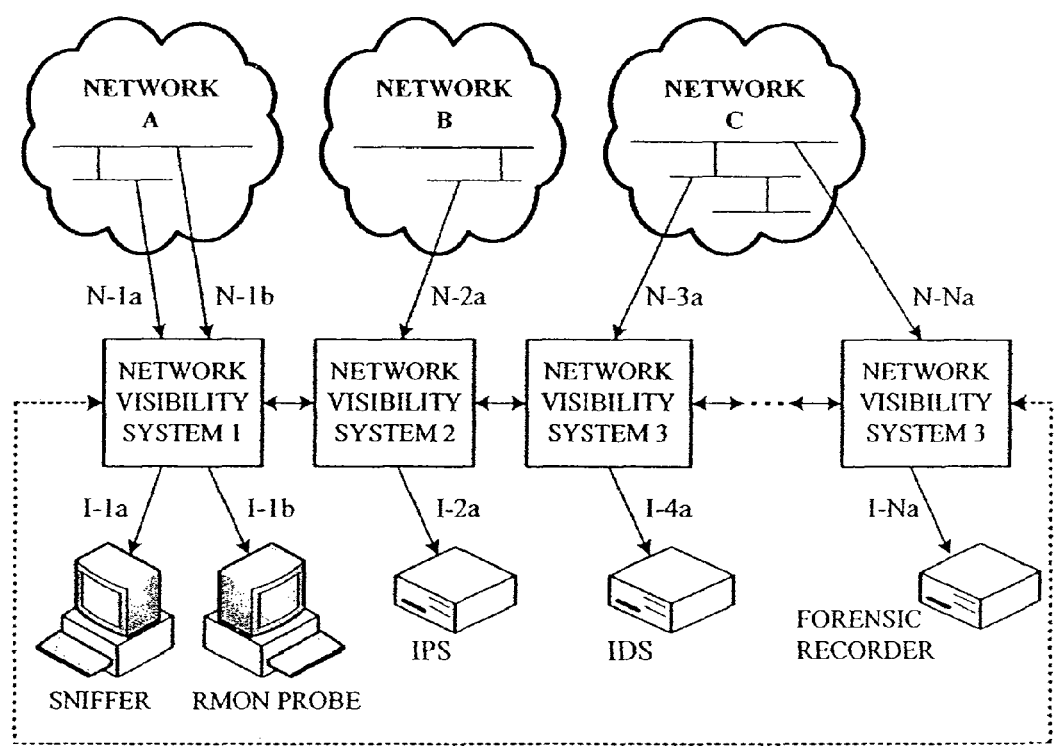
FIG. 17 shows the stacking arrangement of a plurality of the network visibility systems to form an extended network visibility system.

FIG. 17 shows a ring stacking configuration of joining N (where N>1) network visibility systems. Each network visibility system has a left and a right neighbor. Traffic can pass between the neighboring systems bi-directionally. One or more dedicated ports of each system are used for such connections. These dedicated ports are called transport ports and they are neither network ports nor instrument ports.

The connection between System 1 and System N is optional (hence marked in dash line). If the user provides this physical connection, software will automatically disable this connection to prevent a closed loop where packets will loop forever from System 1 to System 2, to System N and back to System 1, then System 2 over and over. However, if any one of the active stacking connections is broken, software will enable the connection between System 1 and System N so that all systems can still be accessed. This offers redundancy protection to the network visibility.

Although a specific stacking configuration is disclosed in FIG. 17, other stacking configurations for network visibility systems could be utilized and they would be within the spirit and scope of the present invention. The stacked systems behave as an extended network visibility system that offers the following features and advantages:

1. Traffic entering one or more network ports of a particular network visibility system can be delivered to one or more instrument ports of one or more different network visibility systems. For example, traffic entering network port N-1a of system 1 can be delivered to the forensic recorder connected to instrument port I-Na of network visibility system N. At the same time the same traffic can be delivered to the sniffer and RMON probe connected to instrument ports I-1 a and I-1b respectively. Therefore the flexibility offered by the any-to-any, one-to-many, many-to-one and many-to-many configurations is no longer limited to just one network visibility system but can be extended across a plurality of such systems.

2. Traffic entering an instrument port of a particular network visibility system can be delivered out of a network port of a different network visibility system. For example, TCP reset packets originated from the IPS connected to instrument port I-2a of system 2 can be delivered to a specific router at a segment of Network A reachable by the network port N-1a of system 1. Therefore the back flow function can be extended to cover a plurality of such network visibility systems.

3. The consequence of items 1 and 2 above is that stacking allows the user to more fully utilize his or her network monitoring, trouble-shooting or security instruments. Without stacking, the user may have to buy multiple units of the same instrument for different network segments. With stacking the user may only need to buy one unit and still can access anywhere among the network segments.

4. Stacking also offers redundancy protection to the network visibility. As mentioned above, if any one of the active stacking connections is broken, software can re-enable the connection between network visibility systems 1 and N so that the overall network visibility is maintained.

5. Stacking also allows the user to control multiple network visibility systems via one single network visibility system. Without stacking, the user has to log in to each network visibility system in order to configure it. With stacking, the user only needs to log in to one such system (designated by the user as the master) and from there the user can configure all the systems.

Additional Embodiments

A method and system in accordance with the present invention is not restricted to a particular packet switch. In fact there are many switches that are commercially available that can be programmed to perform these functions.

In addition, a system and method in accordance with the present invention is not restricted to utilizing one packet switch. For example, multiple packet switches can be stacked together to form a network visibility system with many more ports. These switches can be mounted in one PCB or they can be mounted on multiple PCBS as separate network visibility systems and connected together via a stacking protocol.

Finally, a system and method in accordance with the present invention is not limited to using copper Ethernet or Gigabit Ethernet. In fact with the selection of appropriate PHY chips, it can handle copper and optical Gigabit Ethernet and 10/100 Ethernet, in both full duplex and half duplex formats. It can also handle wireless connections.

Although the present invention has been described in accordance with the embodiments shown, one of ordinary skill in the art will readily recognize that there could be variations to the embodiments and those variations would be within the spirit and scope of the present invention. Although in a preferred embodiment a packet switch is utilized as a switch for providing a network visibility system, one of ordinary skill in the art readily recognizes that the switch can be implemented in a variety of other ways including but not limited to an application specific integrated circuit (ASIC) or a field programmable gate array (FPGA). Accordingly, many modifications may be made by one of ordinary skill in the art without departing from the spirit and scope of the appended claims.

What is claimed is:

1. A method performed by a packet switch device for providing visibility of traffic in a network, the packet switch device includes a first network port, a first instrument port, and a second instrument port, the method comprising:
    receiving a first packet at the first network port of the packet switch device, wherein the first network port is configured to communicate with the network;
    processing the first packet to determine one or more instrument port identifications; and
    transmitting the first packet to the first instrument port for transmission to a first network monitoring instrument, to the second instrument port for transmission to a second network monitoring instrument, or to both, based on a result from the act of processing.

2. The method of claim 1, wherein the first instrument port of the packet switch device communicates with the first network monitoring instrument in an out-of-band configuration.

3. The method of claim 1, wherein the first packet has a first destination address associated with a first location, and the first packet is transmitted to the first instrument port for transmission to the first network monitoring instrument at a second location that is different from the first location.

4. The method of claim 1, wherein the first packet is transmitted to the first instrument port or the second instrument port, and not to both.

5. The method of claim 1, wherein the act of transmitting the first packet comprises multicasting the first packet to both the first instrument port and the second instrument port.

6. The method of claim 1, further comprising:
receiving a second packet at a second network port of the packet switch device, wherein the second network port is configured to communicate with the network; and
transmitting the second packet to the first instrument port for transmission to the first network monitoring instrument, to the second instrument port for transmission to the second network monitoring instrument, or to both.

7. The method of claim 6, wherein the acts of transmitting comprise aggregating the first packet received at the first network port and the second packet received at the second network port, to the first instrument port.

8. The method of claim 6, wherein the acts of transmitting comprise:
aggregating the first packet received at the first network port and the second packet received at the second network port; and
multicasting the aggregated packets to the first instrument port and the second instrument port.

9. The method of claim 1, wherein the first network monitoring instrument comprises an instrument selected from any of a sniffer, an intrusion detection system, a forensic recorder, and a RMON probe.

10. The method of claim 1, further comprising using an egress filter for the first instrument port to process the first packet.

11. The method of claim 1, further comprising dynamically creating a filter based on an input received from the first network monitoring instrument through the first instrument port.

12. A method performed by a packet switch device for providing visibility of traffic in a network, the packet switch device includes a first network port and a first instrument port, the method comprising:
receiving a first packet at the first network port of the packet switch device, wherein the first network port is configured to communicate with the network;
processing the first packet to determine a parameter associated with the first instrument port at the packet switch device; and
transmitting the first packet to the first instrument port for transmission to a first network monitoring instrument based on a result from the act of processing;
wherein the first packet has a first destination address associated with a first location, and the first packet is transmitted to the first instrument port for transmission to the first network monitoring instrument at a second location that is different from the first location.

13. The method of claim 12, wherein the first instrument port of the packet switch device communicates with the first network monitoring instrument in an out-of-band configuration.

14. The method of claim 12, further comprising transmitting the first packet received at the first network port to a second instrument port at the packet switch device for transmission to a second network monitoring instrument.

15. The method of claim 12, further comprising receiving a second packet at a second network port at the packet switch device.

16. The method of claim 15, further comprising transmitting the second packet received at the second network port to the first instrument port.

17. The method of claim 15, further comprising:
transmitting the first packet received at the first network port to the second instrument port; and
transmitting the second packet received at the second network port to the first instrument port.

18. The method of claim 12, wherein the first network monitoring instrument comprises an instrument selected from any of a sniffer, an intrusion detection system, a forensic recorder, and a RMON probe.

19. The method of claim 12, further comprising using an egress filter for the first instrument port to process the first packet.

20. The method of claim 12, further comprising dynamically creating a filter based on an input received from the first network monitoring instrument through the first instrument port.

* * * * *